United States Patent
Ohura et al.

[11] Patent Number: 5,978,655
[45] Date of Patent: Nov. 2, 1999

[54] INFORMATION PROCESSING APPARATUS

[75] Inventors: Seiji Ohura, Kawasaki; Tetsuo Saitoh, Yokohama; Tsuneshi Yokota, Kawasaki; Masumi Oyama, Tokyo, all of Japan

[73] Assignee: Kabushiki Kaisha Toshiba, Kawasaki, Japan

[21] Appl. No.: 08/554,522

[22] Filed: Nov. 7, 1995

[30]  Foreign Application Priority Data

Nov. 8, 1994 [JP] Japan ................................ 6-273920

[51] Int. Cl.⁶ ........................................................ H04B 5/00
[52] U.S. Cl. .............................. 455/41; 455/88; 455/575; 455/90; 455/63; 455/129; 455/269; 343/702; 343/742; 343/867; 235/380; 235/449
[58] Field of Search .................................. 342/42, 44, 51; 455/92, 106, 557, 558, 575, 63, 41, 73, 77, 78, 82, 83, 84, 88, 89, 90, 95, 97, 128, 129, 145, 269, 272, 275, 278.1, 283, 295, 296, 317, 344, 346, 347–349, 351; 375/219, 377, 259; 343/702, 742, 867; 235/492, 449, 380, 382, 382.5; 340/572, 825.54, 825.34

[56]  References Cited

U.S. PATENT DOCUMENTS

| | | | |
|---|---|---|---|
| 2,412,249 | 12/1946 | Brown et al. | 343/867 |
| 4,600,829 | 7/1986 | Walton | 455/41 |
| 4,918,296 | 4/1990 | Fujisaka et al | 235/380 |
| 5,128,972 | 7/1992 | Horinouchi et al. | 455/41 |
| 5,241,160 | 8/1993 | Bashan et al. | 235/380 |
| 5,317,309 | 5/1994 | Vercellotti et al. | 235/380 |
| 5,542,104 | 7/1996 | Ozawa et al. | 343/702 |

FOREIGN PATENT DOCUMENTS

| | | | |
|---|---|---|---|
| 4025107 | 2/1992 | Germany | 455/41 |
| 5763942 | 4/1982 | Japan | 455/73 |
| 9200635 | 1/1992 | WIPO | 455/41 |

*Primary Examiner*—Doris H. To
*Attorney, Agent, or Firm*—Cushman Darby & Cushman IP Group of Pillsbury Madison & Sutro LLP

[57]  ABSTRACT

An information processing apparatus has a transmission antenna and a reception antenna and performs radio transmission/reception with a radio card via the two antennas, thereby performing predetermined information processing. Each of the transmission antenna and reception antenna is formed of a loop antenna. Both antennas are made to overlap each other by a predetermined length so as to prevent mutual electromagnetic interference and are situated in substantially the same plane. Accordingly, even if the transmission antenna and reception antenna are situated close to each other, a signal radiated from the transmission antenna is prevented from interfering with the reception antenna. Thus, the reception antenna can surely receive only a signal radiated from the radio card or an object of communication.

6 Claims, 11 Drawing Sheets

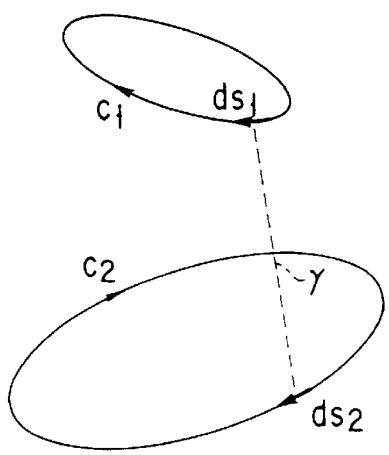
F I G. 3A
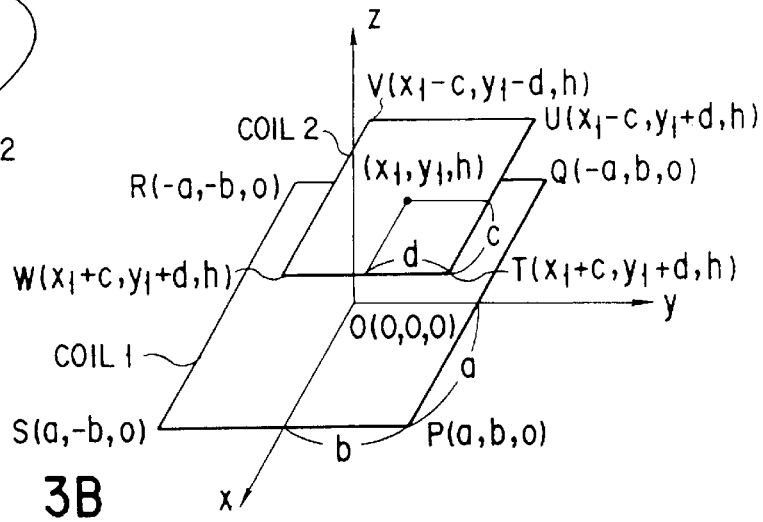
F I G. 3B
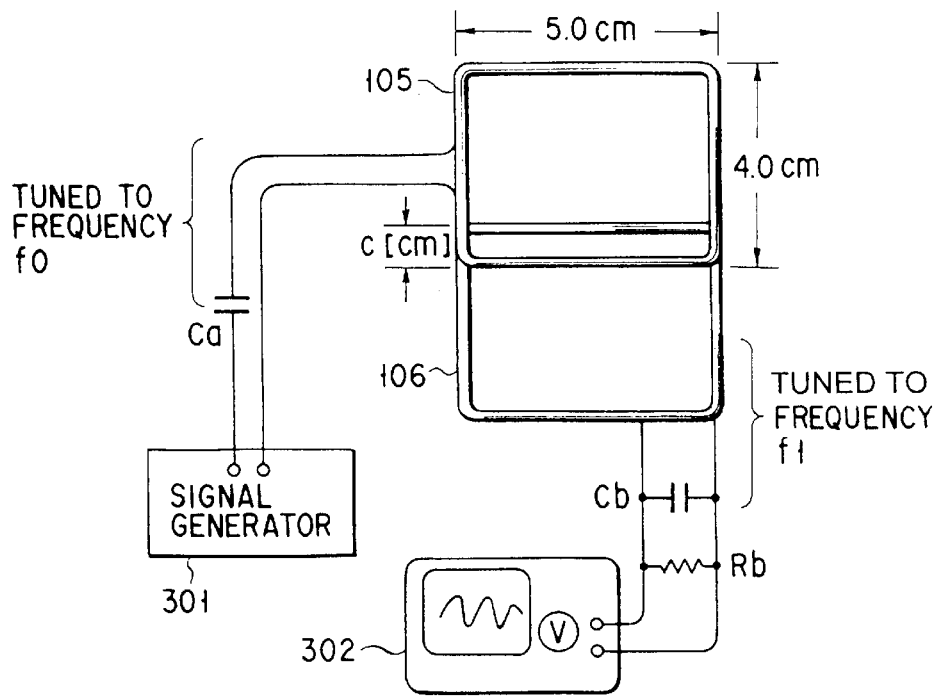
F I G. 4

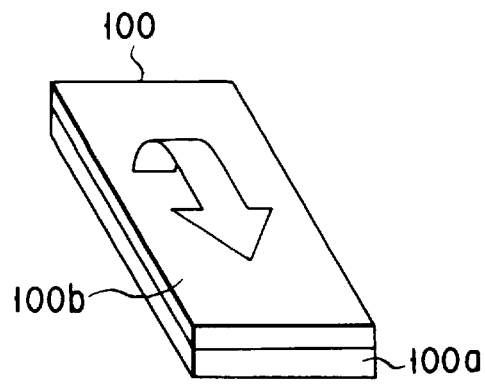
F I G. 13A
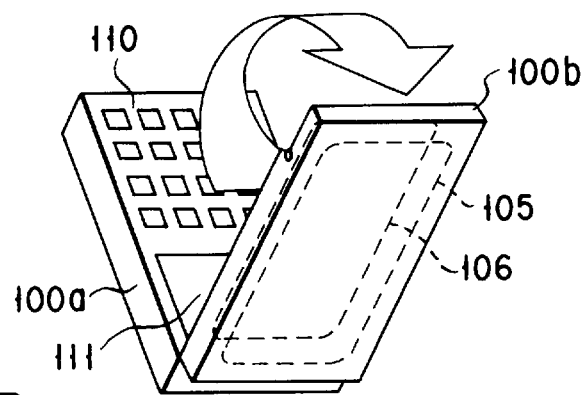
F I G. 13B
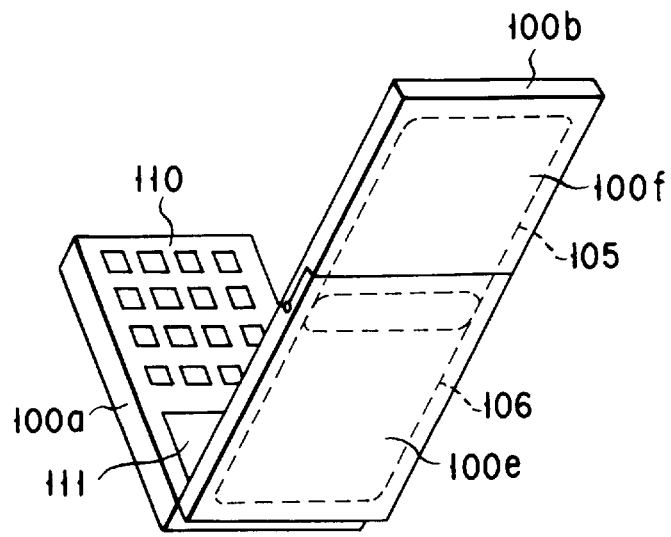
F I G. 13C

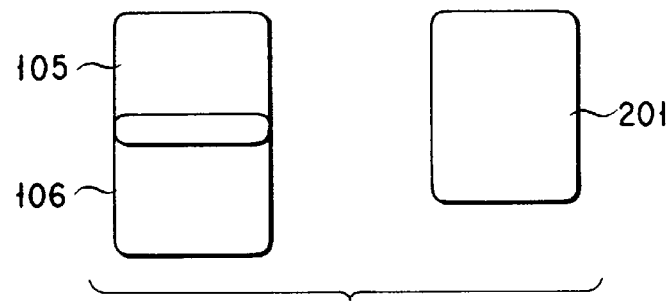
F I G. 14A
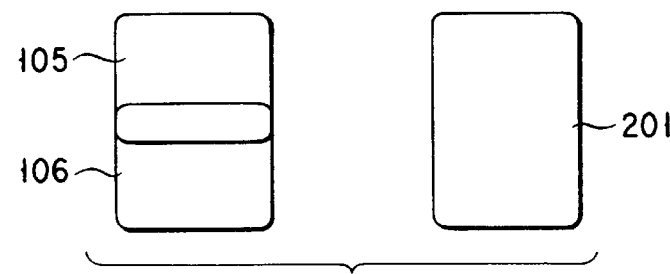
F I G. 14B
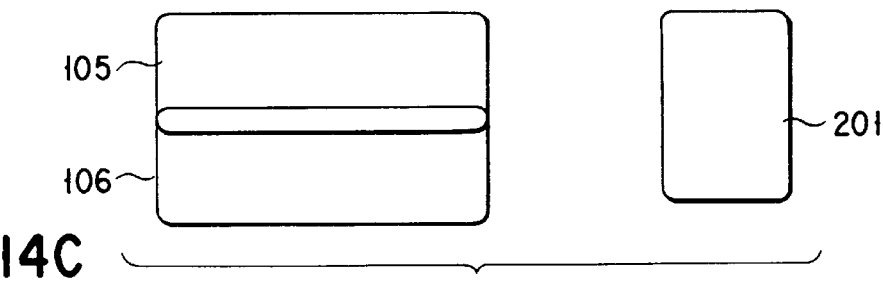
F I G. 14C
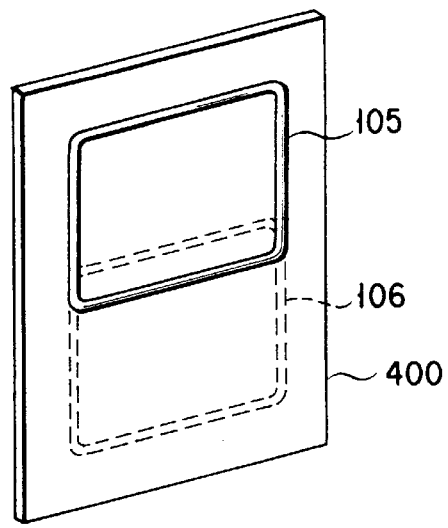
F I G. 15

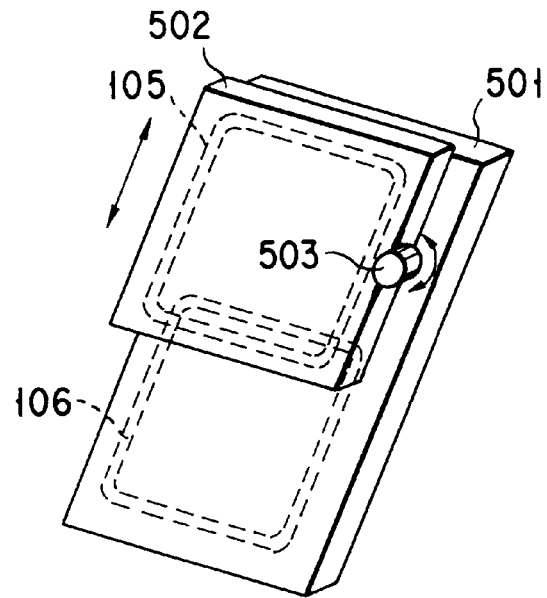
F I G. 16
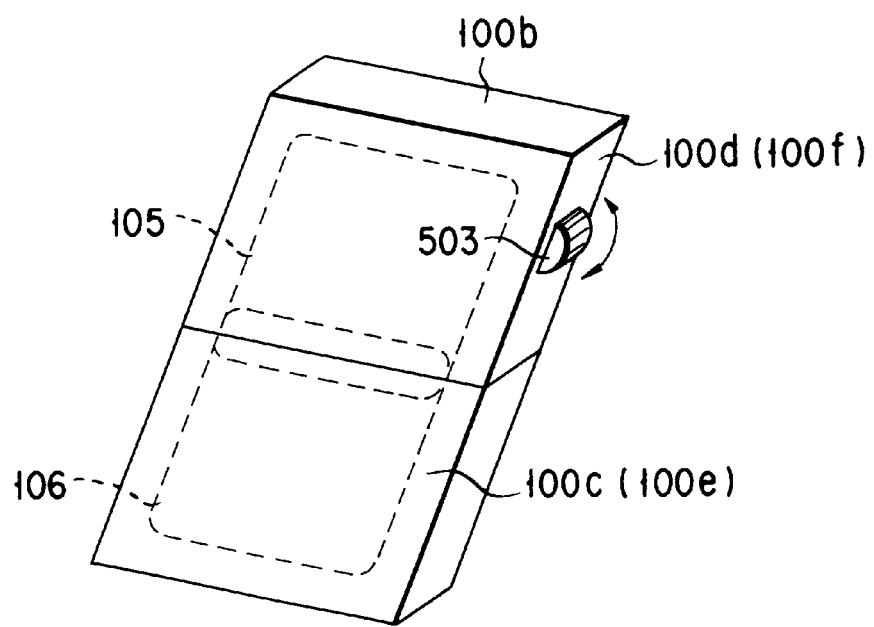
F I G. 17

INFORMATION PROCESSING APPARATUS

BACKGROUND OF THE INVENTION

1. Field of the Invention

The present invention relates to an information processing apparatus, such as a portable radio card reader/writer, for performing radio communication with a radio card functioning as a portable information storage medium with a radio communication function, thereby performing predetermined information processing such as data read/write.

2. Description of the Related Art

Recently, a so-called radio card has been developed and put to practical use as a portable information storage medium with a radio communication function. In general, in a radio card system using this type of radio card, a radio card reader/writer is used to perform radio data transmission/reception with the radio card, thereby performing predetermined information processing such as data read/write with the radio card.

The radio card reader/writer has an antenna for radio data transmission/reception with the radio card. The antenna may be a single antenna system or a double antenna system. The single antenna system is used to perform semi-dual communication, and in this case a single antenna is used as a transmission antenna and a reception antenna by switching.

If full dual communication is performed by the single antenna system, the structure of signal processing circuits becomes complex. Thus, in general, the double antenna system is adopted, and one of two antennas is used as a transmission antenna and the other as a reception antenna. With this structure, the reception is used only for receiving return signals from the radio card.

According to the conventional double antenna system, however, there is a problem of interference in which a signal from the transmission antenna enters the reception antenna. In particular, in the case of a portable radio card reader/writer, a transmission antenna and a reception antenna are generally arranged close to each other. Thus, the interference is conspicuous.

In general, a weak reception signal from the radio card is processed on the reception side, and it is therefore necessary to increase the degree of amplification. As a result, a signal emitted from the radio card reader/writer is easily received by the reception side of the radio card reader/writer, and noise mixing in the signal processing further increases.

In the prior art, in order to solve this problem, a plural stages of filters are provided in a reception circuit, thereby to eliminate an unnecessary reception signal. In this method, however, the number of filters increases and the structure of the system becomes complex. Thus, the manufacturing cost increases.

SUMMARY OF THE INVENTION

The object of the present invention is to provide an information processing apparatus wherein even if a transmission antenna and a reception antenna are situated close to each other, a signal radiated from the transmission antenna is prevented from interfering with the reception antenna and the reception antenna can surely receive only a signal radiated from a radio card or an object of communication.

In order to achieve the above object, according to one aspect of the present invention, there is provided an information processing apparatus for performing radio data transmission/reception with an information storage medium having a transmission/reception antenna for use in both transmission and reception and having a radio communication function, thereby performing predetermined information processing, the apparatus comprising: a transmission antenna, formed in a loop shape, for radiating a first carrier wave of a first radio frequency; and a reception antenna for receiving a second carrier wave of a second radio frequency from the information storage medium, the reception antenna being provided in parallel to the transmission antenna and situated to overlap the transmission antenna by a predetermined length, thereby to prevent electromagnetic mutual interference with the transmission antenna.

According to another aspect of the present invention, there is provided a portable radio card reader/writer for performing radio data transmission/reception with a radio card having a transmission/reception antenna for use in both transmission and reception and having a radio communication function, thereby performing predetermined information processing, the portable radio card reader/writer comprising: processing means for generating transmission data to be transmitted to the radio card and for processing reception data received from the radio card; display means for displaying data processed by the processing means; input means for inputting data to be processed by the processing means; tuning circuit means for transmission, tuned to a first radio frequency, for generating a first carrier wave including the transmission data; a transmission antenna, formed in a loop shape, for radiating the first carrier wave; a reception antenna for receiving a second carrier wave of a second radio frequency from the radio card, the reception antenna being provided in parallel to the transmission antenna and situated to overlap the transmission antenna by a predetermined length, thereby to prevent electromagnetic mutual interference with the transmission antenna; and tuning circuit means for reception, tuned to the second radio frequency, for receiving the second carrier wave including the reception data from the radio card.

Accordingly, each of the transmission antenna and reception antenna is formed of a loop antenna, and the transmission antenna and reception antenna are situated in substantially the same plane such that they have an overlapping portion of a predetermined length. The positional relationship between both antennas is determined so as to reduce their mutual electromagnetic interference to a minimum. Thereby, unlike the prior art, without using a filter or the like, the signal radiated from the transmission antenna can be prevented from being received by the reception signal and the reception antenna can surely receive only the signal radiated from the information storage medium or an object of communication.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A and 3B are views for explaining mutual inductance;

FIG. 4 shows an example of a measuring system relating to extinction of mutual interference;

FIGS. 13A to 13C are perspective views showing still another example of the portable radio card reader/writer according to the present invention;

FIGS. 14A to 14C illustrate external dimensions of a transmission antenna and a reception antenna of a radio card reader/writer and a transmission/reception antenna of a radio card;

FIG. 15 is a perspective view showing an structure wherein the transmission antenna and reception antenna according to the present invention are arranged on a printed board;

FIG. 16 shows an example of an adjusting jig of the present invention for use in setting the positional relationship between the transmission antenna and reception antenna; and FIG. 17 shows an example of an adjusting jig of the present invention for use in setting the positional relationship between the transmission antenna and reception antenna.

DETAILED DESCRIPTION OF THE PREFERRED EMBODIMENTS

Preferred embodiments of the present invention will now be described with reference to the accompanying drawings.

Figure 1:
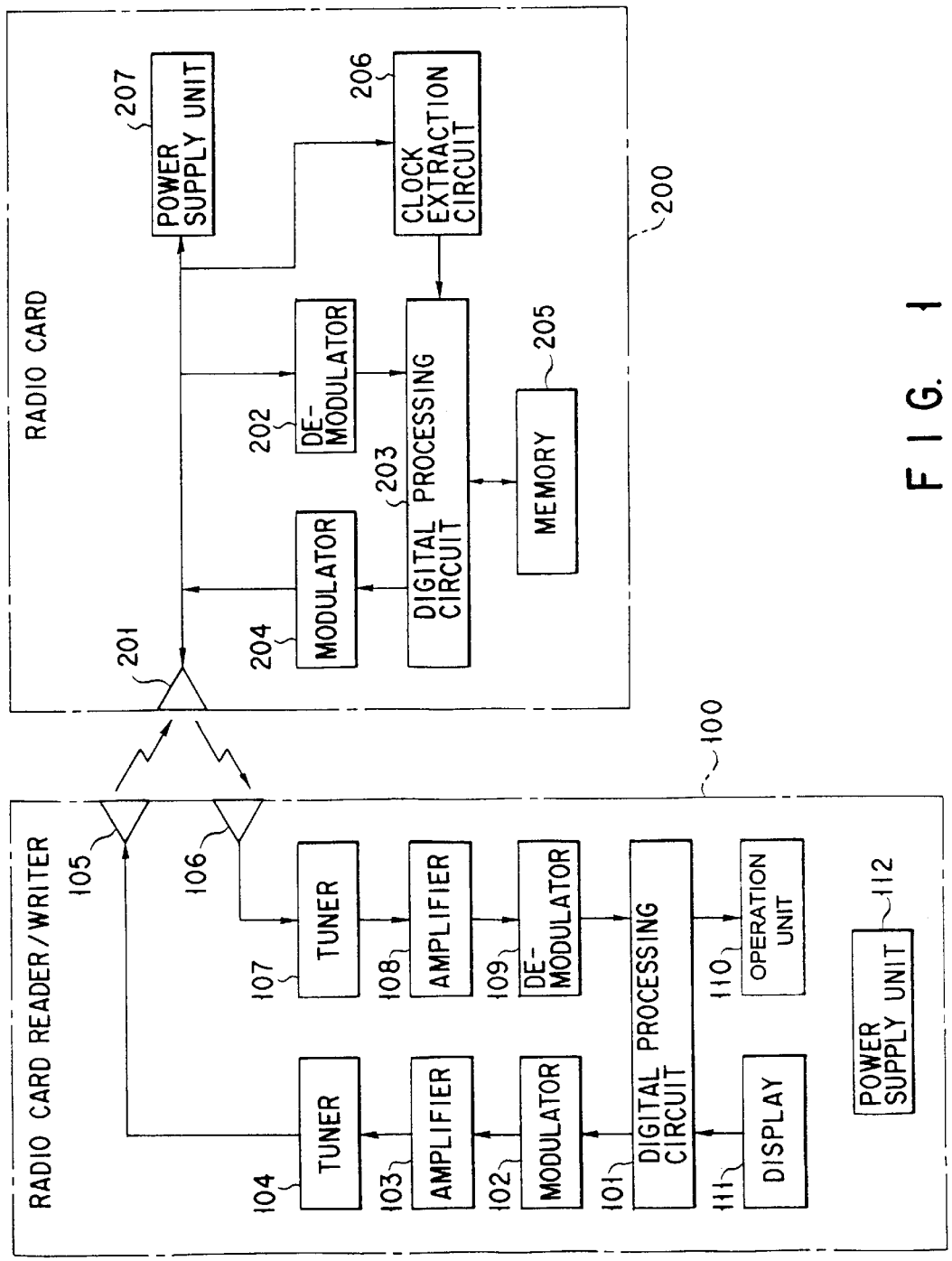
FIG. 1 is a block diagram showing the structure of a radio card system including a radio card reader/writer according to an embodiment of the present invention.

FIG. 1 shows the structure of a radio card system to which an information processing apparatus according to the present invention is applied. The radio card system generally comprises a radio card reader/writer 100 functioning as a main information processing apparatus and a radio card 200 functioning as a portable information storage medium with a radio communication function.

The radio card reader/writer 100 reads data from the radio card 200, transmits a write command to the radio card 200, processes the read data, and transmits write data. The radio card reader/writer 100 comprises a digital processing circuit 101, a modulator 102, an amplifier 103 for transmission, a tuner 104 for transmission, a transmission antenna 105, a reception antenna 106, a tuner 107 for reception, an amplifier 108 for reception, a demodulator 109, an operation unit 110 such as a keyboard, a display 111, and a power supply unit 112 mainly including a battery for supplying an operating electric power to the respective parts.

The radio card 200 writes decoded data of the command from the radio card reader/writer 100, and transmits data. The radio card 200 comprises a transmission/reception antenna 201, a demodulator 202, a digital processing circuit 203, a modulator 204, a memory 205 serving as storage means, a clock extraction circuit 206, and a power supply unit 207 for supplying an operating electric power to the respective parts.

The radio card reader/writer 100 and radio card 200 will now be described in greater detail.

The readout of data from the radio card 200 will first be described. The digital processing circuit 101 of the radio card reader/writer 100 generates a readout command and sends the readout command to the modulator 102. The modulator 102 modulates the command by a freely chosen modulating method and sends the modulated command or signal to the amplifier 103 for transmission. The amplifier 103 amplifies the modulated signal up to a level suitable for radiation. The amplified signal is tuned by the tuner 104 for transmission and the tuned signal is delivered to the transmission antenna 105.

The tuned signal is emitted from the transmission antenna 105 to the external space and is received by the transmission/reception antenna 201 of the radio card 200. The reception signal is demodulated by the demodulator 202 and sent to the digital processing circuit 203. The digital processing circuit 203 subjects the demodulated signal to command analysis. If the analysis result shows that the command is a readout command, the digital processing circuit 203 reads out predetermined data from the memory 205 which stores card data and sends the readout data to the modulator 204. The modulator 204 modulates the predetermined data and delivers the modulated data signal to the transmission/reception antenna 201.

The modulated signal is emitted from the transmission/reception antenna 201 to the external space and received by the reception antenna 106 of the radio card reader/writer 100. The reception signal is sent to the tuner 107 for reception. The tuned signal is sent to the amplifier 108 for reception. The amplifier 108 amplifies the reception signal, and the amplified signal is sent to the demodulator 109 and demodulated. The demodulated signal is sent to the digital processing circuit 101 and subjected to predetermined data processing. The processed data can be displayed by the display 111, where necessary, and data can be input by the operation unit 110.

The writing of data into the radio card 200 will now be described. The digital processing circuit 101 of the radio card reader/writer 100 generates a write command and write data and sends them to the modulator 102. The modulator 102 modulates the command and data by a freely chosen method. The modulated command and data are sent to the amplifier 103 for transmission. The amplifier 103 amplifies the modulated signal (i.e. command and data) up to a level suitable for radiation. The amplified signal is tuned by the tuner 104 for transmission and the tuned signal is delivered to the transmission antenna 105.

The tuned signal is emitted from the transmission antenna 105 to the external space and is received by the transmission/reception antenna 201 of the radio card 200. The reception signal is demodulated by the demodulator 202 and sent to the digital processing circuit 203. The digital processing circuit 203 subjects the demodulated signal to command analysis. If the analysis result shows that the command is a write command, the digital processing circuit 203 writes the write data, which is sent after the write command, at a predetermined address in the memory 205. The power supply unit 207 within the radio card 200 receives electromagnetic energy from the radio card reader/writer 100 and supplies electric power to be consumed in the radio card 200. The power supply unit 207 may be replaced with a built-in battery.

The clock extraction circuit 206 in the radio card 200 extracts clocks from the electromagnetic waves sent from the radio card reader/writer 100, and generates clocks necessary for operating the respective circuits or parts. The clock extraction circuit 206 may be replaced with an oscillator for generating clocks.

As has been described above, in the radio card reader/writer 100, the transmission antenna 105 and reception antenna 106 need to be arranged close to each other in a position opposed to the transmission/reception antenna 201 of the radio card 200. An intense signal is emitted from the transmission antenna 105 to the radio card 200. On the other hand, the reception system of the radio card reader/writer 100 needs to receive a weak signal from the radio card 200 and therefore is designed to have high sensitivity.

Figure 2:
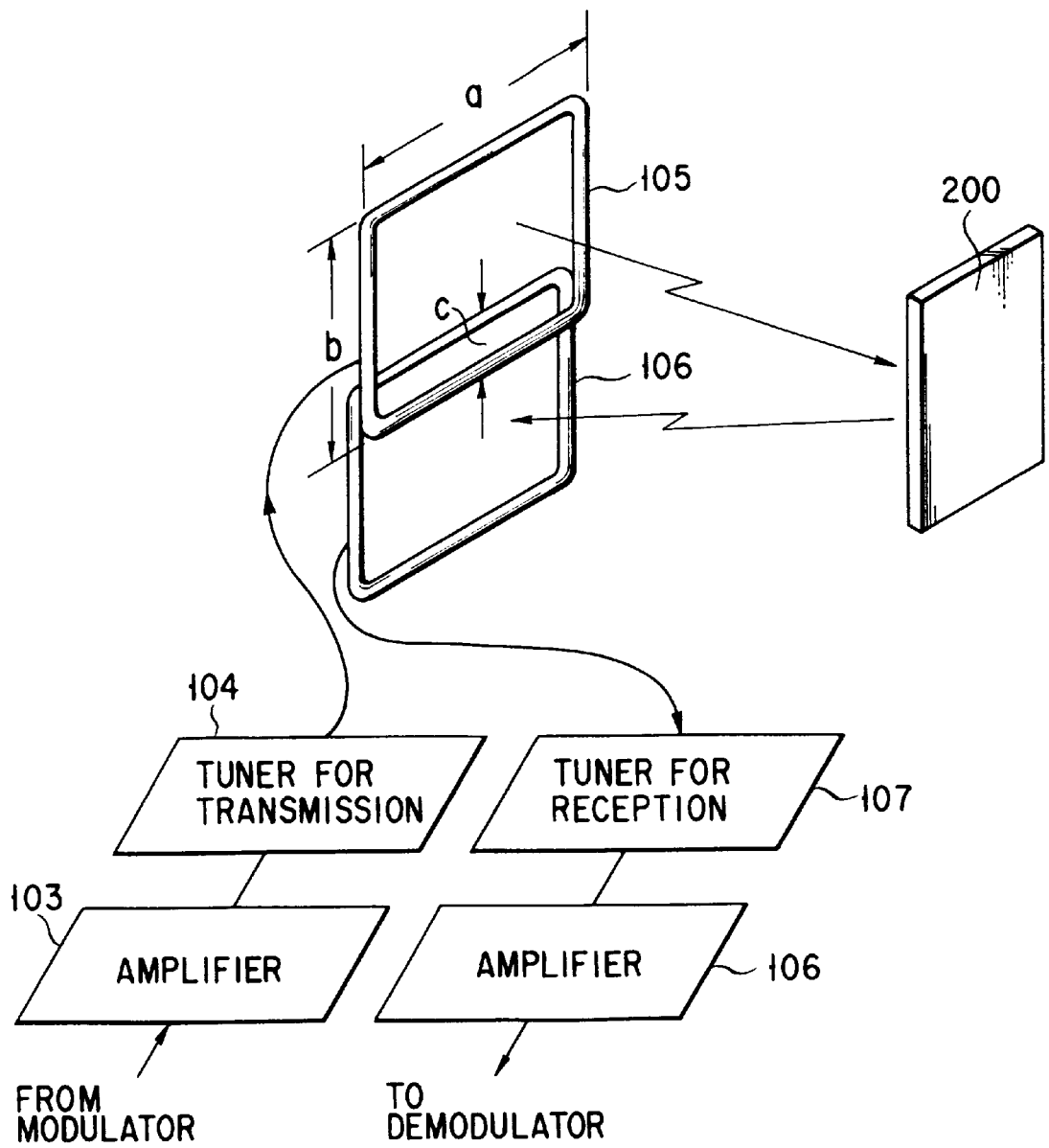
FIG. 2 shows the structures and positional relationship between a transmission antenna and a reception antenna of the radio card reader/writer.

FIG. 2 shows the structures and positional relationship between the transmission antenna 105 and reception antenna 106 of the radio card reader/writer 100. Both transmission antenna 105 and reception antenna 106 are rectangular loop antennas which are situated substantially in the same plane and overlap each other by a predetermined length c. In the present example, each of the two antennas 105 and 106 has a horizontal dimension a, a vertical dimension b and the number n of windings. Each of the values is a freely chosen one.

With this structure, mutual inductance is extinguished in the overlapping portion of length c, and mutual interference can be eliminated. Accordingly, the signal emitted from the transmission antenna 105 does not mix in the reception antenna 106.

The mutual inductance will now be explained. The mutual inductance can be derived by a Neumann's formula. When there are two electric circuits C1 and C2, as shown in FIG. 3A, mutual inductance $M_{21}$ is expressed by equation (1):

$$M_{21} = \frac{\mu}{4\pi} \int_{c_2} \int_{c_1} \frac{\cos\theta ds_1 ds_2}{r} \tag{1}$$

where
  θ=the angle between current portions ds1 and ds2 indicated by arrows in FIG. 3A,
  $\mu$=the magnetic permeability, and
  r=the distance between ds1 and ds2.

Suppose that as show in FIG. 3B, the electric circuits C1 and C2 are respectively a single rectangular winding coil 1 with dimensions of adjacent two sides being 2a×2b and a single rectangular winding coil 2 with dimensions of adjacent two sides being 2c×2d, and the two coils are situated in parallel. Also, suppose that a center of coil 1 is 0(0, 0, 0), and a center of coil 2 is ($x_1$, $y_1$, h).

If M=the mutual inductance between the two coils,
  M1=the mutual inductance between PQ and TU,
  M2=the mutual inductance between PQ and VW,
  M3=the mutual inductance between RS and VW,
  M4=the mutual inductance between RS and TU,
  M5=the mutual inductance between SP and WT,
  M6=the mutual inductance between SP and UV,
  M7=the mutual inductance between QR and UV, and
  M8=the mutual inductance between QR and WT,
the following equation is given $$M=M1-M2+M3-M4+M5-M6+M7-M8 [H]$$

With respect to M1, M2, ..., M8, if the magnetic permeability in vacuum is $\mu 0$, (1) Mi is given by equation (2) below (i=1, 2, 3, or 4):

$$M_i = \frac{\mu_0}{4\pi} \left\{ (a - x_1 + c)\log\frac{a - x_1 + c + \sqrt{k_i^2 + (a - x_1 + c)^2}}{k_i} - \right.$$
$$(a - x_1 - c)\log\frac{a - x_1 - c + \sqrt{k_i^2 + (a - x_1 - c)^2}}{k_i} +$$
$$(a + x_1 + c)\log\frac{a + x_1 + c + \sqrt{k_i^2 + (a + x_1 + c)^2}}{k_i} -$$
$$(a + x_1 - c)\log\frac{a + x_1 - c + \sqrt{k_i^2 + (a + x_1 - c)^2}}{k_i} -$$
$$\sqrt{k_i^2 + (a - x_1 + c)^2} + \sqrt{k_i^2 + (a - x_1 - c)^2} -$$
$$\left. \sqrt{k_i^2 + (a + x_1 + c)^2} + \sqrt{k_i^2 + (a + x_1 - c)^2} \right\} \tag{2}$$

where, a=½ of the length of one of two adjacent sides of coil,
  b=½ of the length of the other of two adjacent sides of coil 2,
  c=½ of the length of one of two adjacent sides of coil 2,
  d=½ of the length of the other of two adjacent side of coil.
  $x_1$=the position of coil 2 in the X-direction, and
  $y_1$=the position of coil 2 in the Y-direction.
In this case, $$k_1 = \sqrt{(b - d - y_1)^2 + h^2} \quad \text{(when } i = 1) \tag{3}$$
$$k_2 = \sqrt{(b + d - y_1)^2 + h^2} \quad \text{(when } i = 2)$$
$$k_3 = \sqrt{(b - d + y_1)^2 + h^2} \quad \text{(when } i = 3)$$
$$k_4 = \sqrt{(b + d + y_1)^2 + h^2} \quad \text{(when } i = 4)$$

(2) Further, Mj is given by equation (4) below (j=5, 6, 7 or 8):

$$M_j = \frac{\mu}{4\pi} \left\{ (b - y_1 + d)\log\frac{b - y_1 + d + \sqrt{k_j^2 + (b - y_1 + d)^2}}{k_j} - \right.$$
$$(b - y_1 - d)\log\frac{b - y_1 - d + \sqrt{k_j^2 + (b - y_1 - d)^2}}{k_j} +$$
$$(b + y_1 + d)\log\frac{b + y_1 + d + \sqrt{k_j^2 + (b + y_1 + d)^2}}{k_j} - \tag{4}$$

-continued $$(b+y_1-d)\log\frac{b+y_1-d+\sqrt{k_j{}^2+(b+y_1-d)^2}}{k_j} -$$

$$\sqrt{k_j{}^2+(b-y_1+d)^2} + \sqrt{k_j{}^2+(b-y_1-d)^2} -$$

$$\sqrt{k_j{}^2+(b+y_1+c)^2} + \sqrt{k_j{}^2+(b-y_1+c)^2} \Bigg\}$$

In this case, $$k_5 = \sqrt{(a-x_1-c)^2+h^2} \quad \text{(when } j=5\text{)} \tag{5}$$

$$k_6 = \sqrt{(a-x_1+c)^2+h^2} \quad \text{(when } j=6\text{)}$$

$$k_7 = \sqrt{(a+x_1-c)^2+h^2} \quad \text{(when } j=7\text{)}$$

$$k_8 = \sqrt{(a+x_1+c)^2+h^2} \quad \text{(when } j=8\text{)}$$

In this embodiment, the coil 1 corresponds to the transmission antenna 105, and the coil 2 corresponds to the reception antenna 106.

Figure 5:
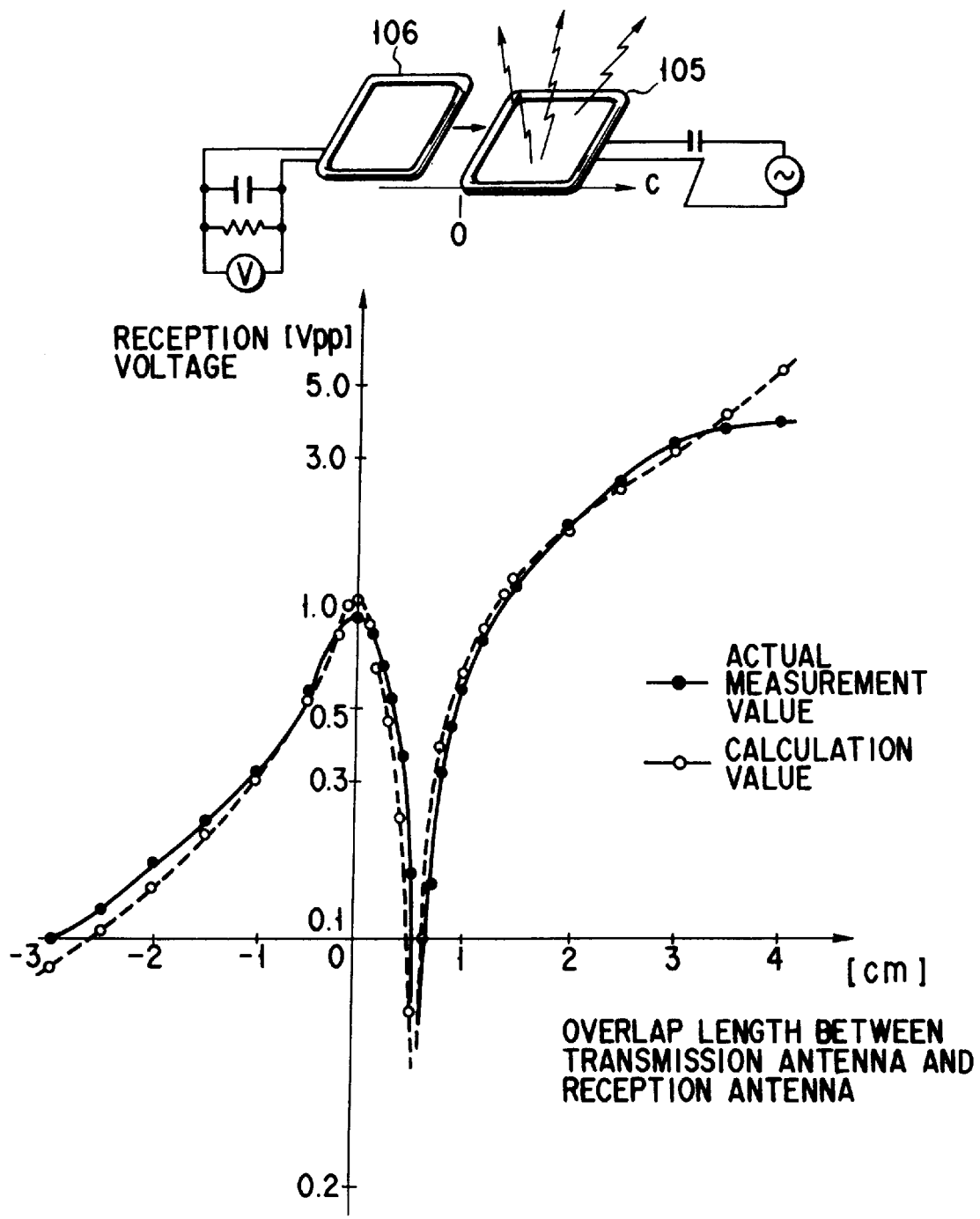
FIG. 5 is a graph showing an example of a measurement result relating to extinction of mutual interference.

FIGS. 4 and 5 show an example of a measuring system relating to extinction of mutual interference and an example of a measurement result. FIG. 4 shows a measuring system and FIG. 5 shows a reception voltage of a reception signal as a measurement result. The transmission antenna 105 and reception antenna 106 comprise rectangular coils, as shown in FIG. 4. A signal generator 301 is connected to a series circuit comprising the transmission antenna 105 and a capacitor Ca. The signal generator 301 supplies a signal of frequency f0 to the series circuit. The reception antenna 106 is situated to have an overlap portion of c [cm] with the transmission antenna 105, as shown in FIG. 4. A parallel oscillation circuit comprising the reception antenna 106 and a capacitor Cb is tuned to frequency f1. A resistor Rb is connected in parallel to the capacitor Cb. A signal voltage between both ends of the resistor Rb is observed by an oscilloscope 302.

As is shown in FIG. 5, the intensity (reception voltage) of the transmission signal mixing in the reception system varies, depending on the length c of the overlap portion. The minus (−) sign of the horizontal axis indicates the increase in distance between both antennas. The vertical axis indicates the reception signal by logarithm. In the present embodiment, the mutual interference is reduced to substantially zero at c=0.57 cm.

The transmission antenna 105 is formed of 20 windings of a 0.3 Φ copper wire, and has an inductance of 49.8 μH. The reception antenna 106 is formed of 20 windings of a 0.3 Φ copper wire, and has an inductance of 49.9 μH. The horizontal dimension of each of antennas 105 and 106 is 5.0 cm and the vertical dimension thereof is 4.0 cm.

Figure 6:
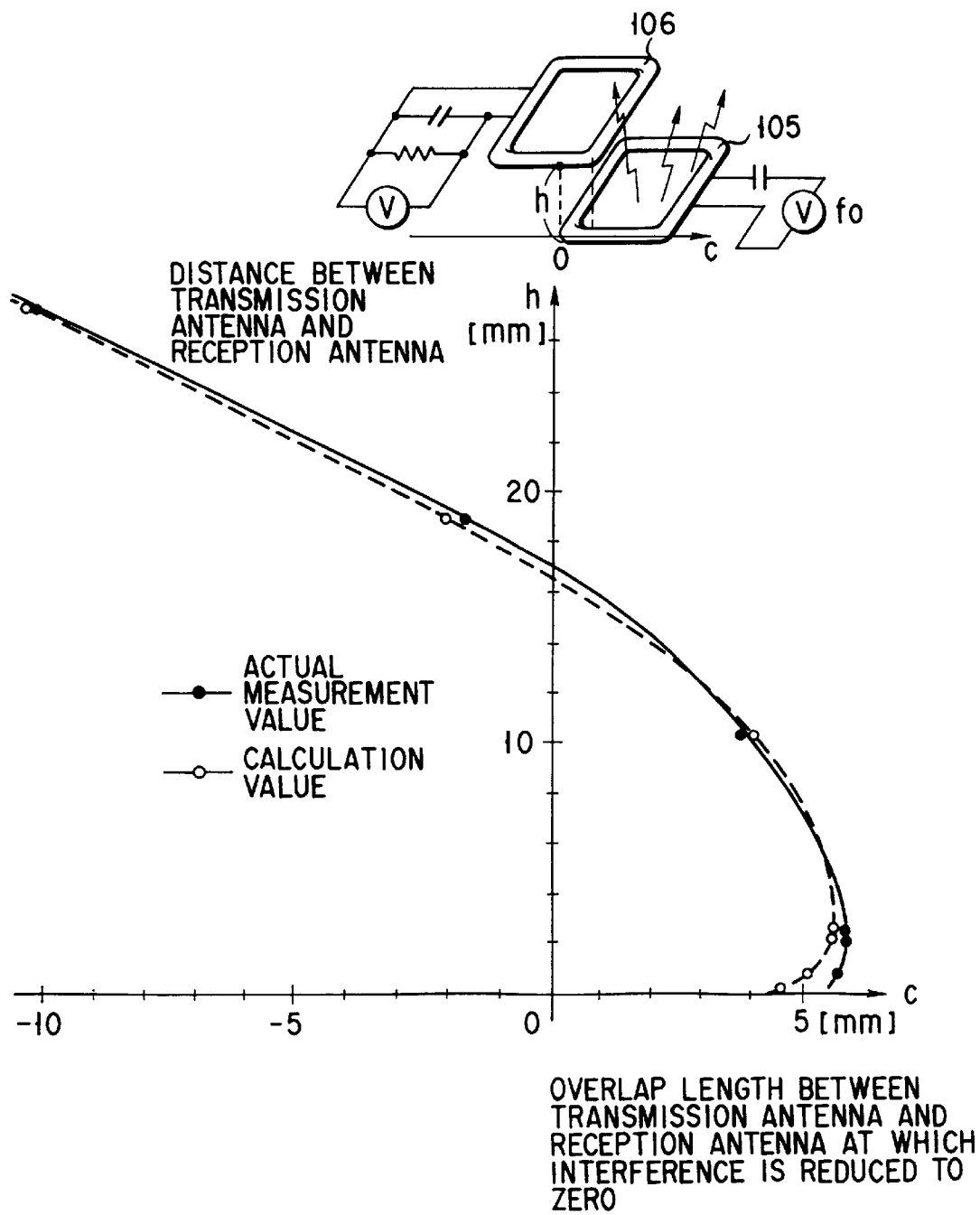
FIG. 6 shows an example of a measurement result relating to the length of an overlapping portion where mutual interference is extinguished.

FIG. 6 shows a measurement result of the length c of the overlap portion at which the mutual interference is reduced to zero, with the distance h between the transmission antenna 105 and reception antenna 106 varied. As is shown in FIG. 6, the length c of the overlap portion was measured, at which the signal of frequency f0 emitted from the transmission antenna 105 was not received by the reception antenna 106 turned to frequency f1. The length c of the overlap portion varies in accordance with the distance h.

Figure 7:
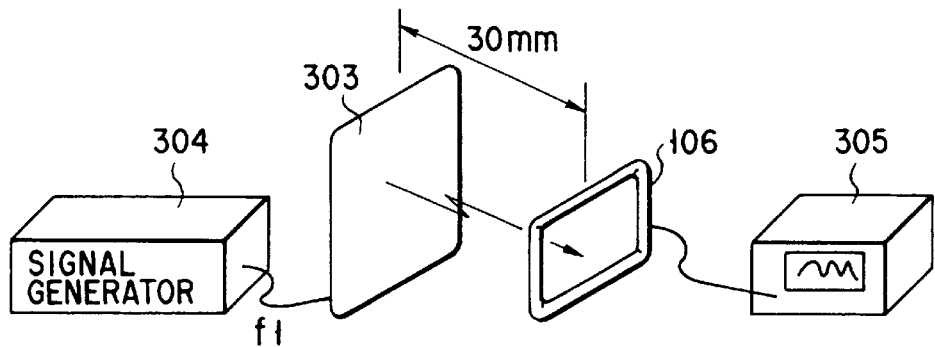
FIG. 7 illustrates a measuring method relating to extinction of mutual interference.
Figure 8:
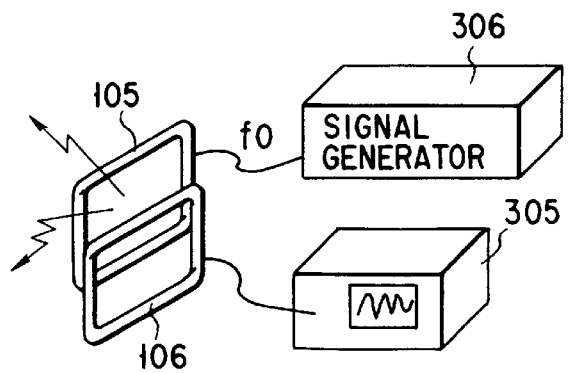
FIG. 8 illustrates another measuring method relating to extinction of mutual interference.
Figure 9:
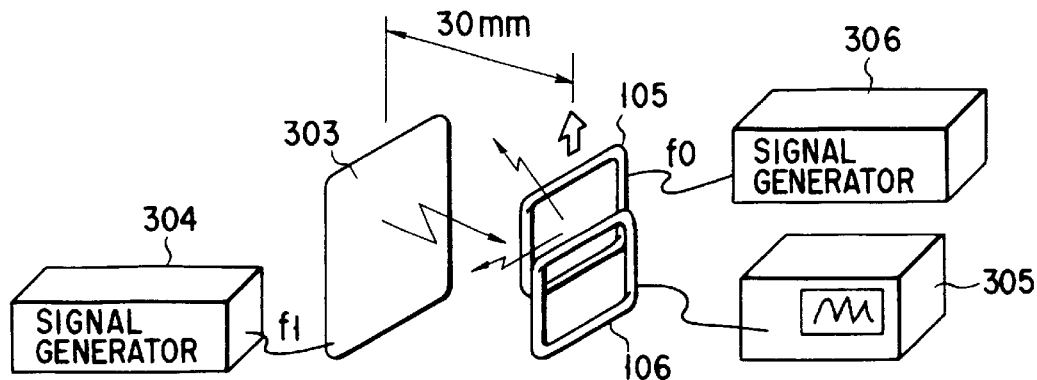
FIG. 9 illustrates another measuring method relating to extinction of mutual interference.

FIGS. 7 to 9 illustrate a measuring operation in which a carrier wave of frequency f1 is radiated from an antenna 303, which is supposed to be the radio card 200, a signal of frequency f0 is radiated from the transmission antenna 105, and a signal received by the reception antenna 106 is measured. FIGS. 10A to 10F show a measurement result obtained in this measuring operation.

Figure 10A:
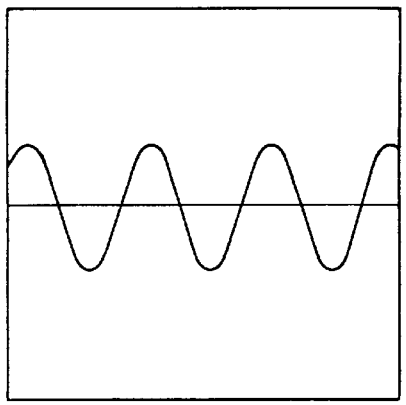
FIGS. 10A to 10F show waveforms of measurement results relating to extinction of mutual interference.

At first, as is shown in FIG. 7, a signal generator 304 was connected to the antenna 303 supposed to be the radio card 200, and a carrier wave of frequency f1 was radiated from the antenna 303. A signal of a waveform as shown in FIG. 10A was observed by a measuring device (oscilloscope) 305 connected to the reception antenna 106 located at a distance of, e.g. 30 mm from the antenna 303. The amplitude of this signal was about 480 mVpp.

Figure 10B:
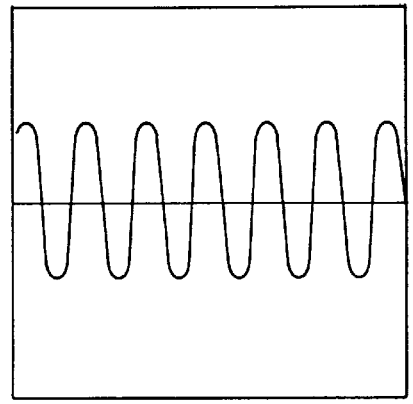
Figure 10C:
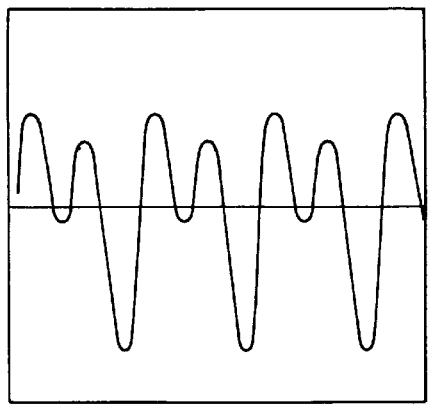

Then, as shown in FIG. 8, the transmission antenna 105 and reception antenna 106 were arranged such that mutual interference would occur. When a signal of frequency f0 was supplied from a signal generator 306 to the transmission antenna 105, a signal of a waveform as shown in FIG. 10B was observed by the measuring device 305 connected to the reception antenna 106. The amplitude of this signal was about 600 mVpp.

Subsequently, as shown in FIG. 9, the antenna 303 supposed to be the radio card 200, which is shown in FIG. 7, was situated similarly at a distance of 30 mm from the antenna structure shown in FIG. 8. When the same-level signal was radiated, the reception antenna 106 received a compound wave (see FIG. 10C) of the signal of frequency f0 from the transmission antenna 105 and the signal of frequency f1 from the antenna 303 supposed to be the radio card. In this case, the length c of the overlap portion was about 10 mm, which was not the value at which the mutual interference decreases to zero.

Figure 10D:
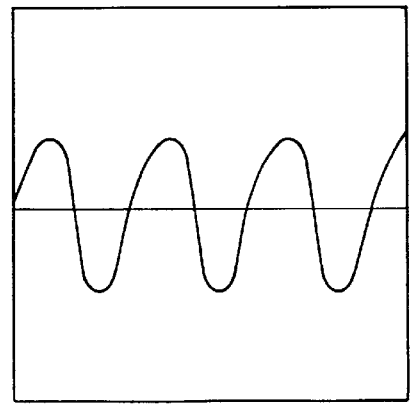
Figure 10E:
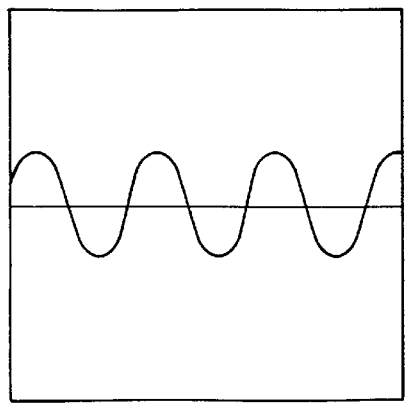
Figure 10F:
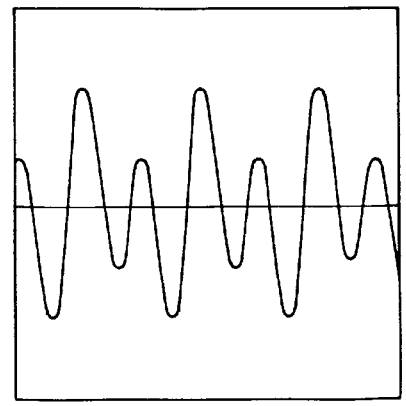

If the length c of the overlap portion is varied, a waveform shown in FIG. 10D is obtained at c=6.7 mm. A waveform shown in FIG. 10E is obtained at c=5.7 mm. It is understood that the signal of frequency f0 is extinguished at this length. At c=0 mm, a waveform shown in FIG. 10F is obtained and a compound wave of frequencies f1 and f0 is formed. As compared to the waveform shown in FIG. 10A, the signal shown in FIG. 10E has a negligible influence by the signal radiated from the transmission antenna 105.

Figure 11A:
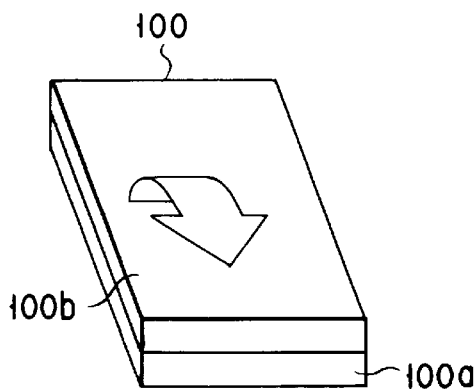
FIGS. 11A and 11B are perspective views showing an example of the portable radio card reader/writer according to the present invention.
Figure 11B:
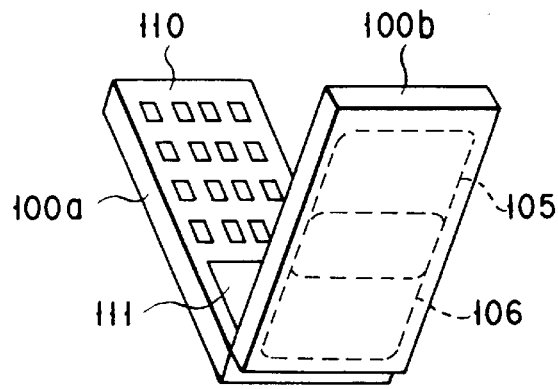

A specific structure of the radio card reader/writer according to the present invention will now be described with reference to FIGS. 11A to 13C. FIGS. 11A and 11B show the radio card reader/writer 100 with a portable structure. The transmission antenna 105 and reception antenna 106 are built in a body cover 100b. The body cover 100b is openable relative to a body 100a. When the cover 100b is opened, a key operation of an operation unit 110 can be performed and the antennas can be set at the same time.

Figure 12A:
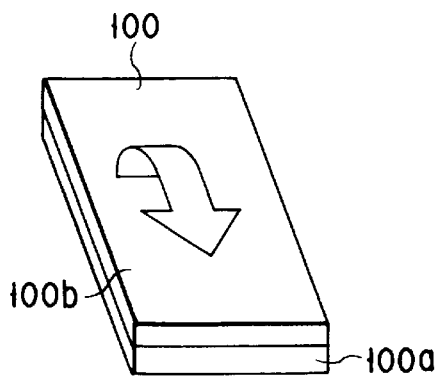
FIGS. 12A to 12C are perspective views showing another example of the portable radio card reader/writer according to the present invention.
Figure 12B:
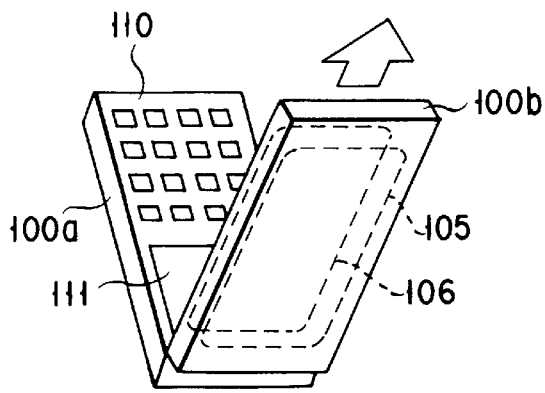
Figure 12C:
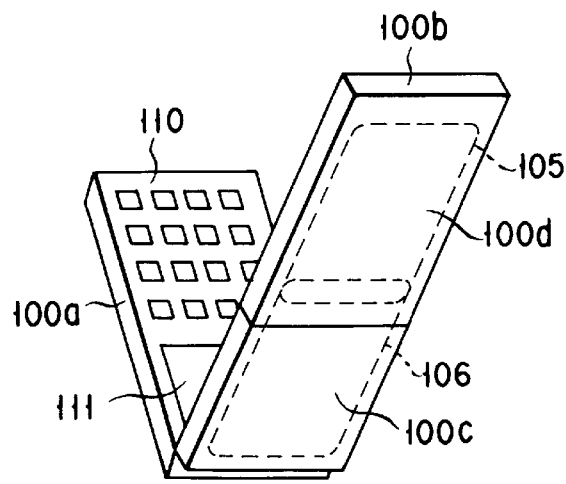

FIGS. 12A to 12C show a developed version of the radio card reader/writer shown in FIGS. 11A and 11B. In order to obtain a longer communication distance, the dimensions of the transmission antenna 105 and reception antenna 106 can be increased. Like the apparatus shown in FIGS. 11A and 11B, the radio card reader/writer 100 is provided with the body cover 100b which is openable relative to the body 100a. The body cover 100b comprises a stationary part 100c and a slidable part 100d which is slidable relative to the stationary part 100c. The transmission antenna 105 and reception antenna 106 are built in the stationary part 100c and slidable part 100d, respectively. When the body cover 100b is opened, the slidable part 100d is extended upward from the stationary part 100c. In this case, the transmission antenna 105 and reception antenna 106 are stopped in the positional relationship in which the aforementioned mutual interference is reduced to zero. As compared to the structure shown in FIGS. 11A and 11B, the area of the antennas is almost doubled.

FIGS. 13A to 13C show a modification of the structure shown in FIGS. 12A to 12C. Like the structure shown in FIGS. 12A to 12C, the radio card reader/writer 100 is provided with the body cover 100b which is openable relative to the body 100a. The body cover 100b comprises a stationary part 100e and an openable part 100f which is slidable relative to the stationary part 100e. The transmission antenna 105 and reception antenna 106 are built in the stationary part 100e and openable part 100f, respectively. When the body cover 100b is opened, the openable part 100f can also be opened relative to the stationary part 100e. In this case, the transmission antenna 105 and reception antenna 106 are stopped in the positional relationship in which the aforementioned mutual interference is reduced to zero. The same advantage as with the structure shown in FIGS. 12A to 12C can be obtained.

FIGS. 14A to 14C illustrate external dimensions of the transmission antenna 105 and reception antenna 106 of the radio card reader/writer 100 and the transmission/reception antenna 201 of the radio card 200.

In FIG. 14A, each of the transmission antenna 105 and reception antenna 106 is smaller than the transmission/reception antenna 201 of the radio card 200. Thereby, transmission/reception can be performed without extinguishing the mutual inductance between the transmission antenna 105 and transmission/reception antenna 201 or the mutual inductance between the reception antenna 106 and transmission/reception antenna 201.

In FIG. 14B, the outside dimensions of the combination of the transmission antenna 105 and reception antenna 106 are substantially equal to those of the transmission/reception antenna 201 of the radio card 200. Thereby, the signal from the transmission antenna 105 can be efficiently received by the transmission/reception antenna 201 of the radio card 200, and the signal from the transmission/reception antenna 201 can be efficiently received by the reception antenna 106.

In FIG. 14C, the outside dimension, for example, the horizontal dimension, of each of the transmission antenna 105 and reception antenna 106 is made greater than that of the transmission/reception antenna 201 of the radio card 200. Thereby, transmission/reception over a wide range can be performed.

FIG. 15 shows an example of the specific structure of the transmission antenna 105 and reception antenna 106. The transmission antenna 105 is printed in a loop shape on one surface of an electrically insulating board 400 and the reception antenna 106 is printed in a loop shape on the other surface of the board 400 so that the aforementioned conditions for arrangement can be satisfied. Thereby, the antenna system can be thinned and the physical and electrical errors occurring in forming the antenna system can be reduced to a minimum.

FIGS. 16 and 17 show an example of an adjusting jig for setting the positional relationship between the transmission antenna 105 and reception antenna 106. Specifically, in FIG. 16, the reception antenna 106 is formed on one surface of an antenna base 501, and a transmission antenna fixing table 502 on which the transmission antenna 105 is formed is slidably provided on the other surface of the antenna base 501. The transmission antenna fixing table 502 can be vertically moved on the antenna base 501 by the rotation of an adjusting jig (dial) 503. For example, a signal of frequency f0 is supplied to the transmission antenna 105, and a reception voltage received by the reception antenna 106 is measured. The transmission antenna 105 is moved by the adjusting jig 503 so as to minimize the reception voltage. Thereby, the optimal positional relationship between the transmission antenna 105 and reception antenna 106 is determined. By virtue of such a fine adjustment mechanism, the mutual interference between the transmission antenna 105 and reception antenna 106 can be reduced to a minimum.

In FIG. 17, the transmission antenna 105 provided within the body cover 100b of the portable radio card reader/writer 100 shown in FIGS. 12A to 12C or 13A to 13C can be moved by the same adjusting jig 503 as shown in FIG. 16. In this case, the advantage and adjusting method are the same as those in the case of FIG. 16. When the jig 503 is rotated, the antenna 105 in the body cover is vertically moved.

As has been described above, according to the present invention, unlike the prior art, the problem of mutual interference occurring when the transmission antenna and reception antenna of the radio card reader/writer are arranged close to each other can be solved only by adjusting the positional relationship of the antennas, without using filters.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable information processing apparatus for Performing radio data transmission/reception with an information storage medium having a transmission/reception antenna for use in both transmission and reception and having a radio communication function thereby performing predetermined information processing, said apparatus comprising:

a transmission antenna, formed in a loop shape for radiating a first carrier wave of a first radio frequency;

a reception antenna for receiving a second carrier wave of a second radio frequency from said information storage medium, said reception antenna being provided in parallel to said transmission antenna and situated to overlap said transmission antenna by a predetermined length, thereby to reduce electromagnetic mutual interference with said transmission antenna; and adjusting means for adjusting the length of the overlapping portion of the transmission antenna and the reception antenna, whereby an optimal positional relationship between the transmission antenna and the reception antenna is determined to reduce the electromagnetic mutual interference to a minimum.

2. A portable radio card reader writer for performing radio data transmission/reception with a radio card having a transmission/reception antenna for use in both transmission and reception and having a radio communication function, thereby performing predetermined information processing, said portable radio card reader/writer comprising:

processing means for generating transmission data to be transmitted to the radio card and for processing reception data received from the radio card;

display means for displaying data processed by said processing means;

input means for inputting data to be processed by said processing means;

tuning circuit means for transmission, tuned to a first radio frequency, for generating a first carrier wave including said transmission data;

a transmission antenna, formed in a loop shape, for radiating said first carrier wave;

a reception antenna for receiving a second carrier wave of a second radio frequency from said radio card, said reception antenna being provided in parallel to said transmission antenna and situated to overlap said transmission antenna by a predetermined length, thereby to reduce electromagnetic mutual interference with said transmission antenna;

tuning circuit means for reception, tuned to the second radio frequency, for receiving the second carrier wave including the reception data from the radio card; and means for sliding said transmission antenna and said reception antenna relative to each other, wherein said transmission antenna and said reception antenna are slid relative to each other to a stop position, thereby arranging both antennas such that both antennas overlap each other by said predetermined length, wherein said radio card reader/writer can be folded into a plurality of parts.

3. A portable radio card reader/writer for performing radio data transmission/reception with a radio card having a transmission/reception antenna for use in both transmission and reception and having a radio communication function, thereby performing predetermined information processing, said portable radio card reader/writer comprising:

processing means for generating transmission data to be transmitted to the radio card and for processing reception data received from the radio card;

display means for displaying data processed by said processing means;

input means for inputting data to be processed by said processing means;

tuning circuit means for transmission, tuned to a first radio frequency, for generating a first carrier wave including said transmission data;

a transmission antenna, formed in a loop shape, for radiating said first carrier wave;

a reception antenna for receiving a second carrier wave of a second radio frequency from said radio card, said reception antenna being provided in parallel to said transmission antenna and situated to overlap said transmission antenna by a predetermined length, thereby to reduce electromagnetic mutual interference with said transmission antenna;

tuning circuit means for reception, tuned to the second radio frequency, for receiving the second carrier wave including the reception data from the radio card; and means for folding said transmission antenna and said reception antenna toward each other, wherein said transmission antenna and said reception antenna are unfolded away from each other, thereby arranging both antennas such that both antennas overlap each other by said predetermined length, wherein said radio card reader/writer can be folded into a plurality of parts.

4. A data transmission/reception method in a portable information processing apparatus for performing radio data transmission/reception with an information storage medium having a transmission/reception antenna for use in both transmission and reception and having a radio communication function, thereby performing predetermined information processing, said method comprising:

radiating a first carrier wave of a first radio frequency from a transmission antenna formed in a loop shape;

receiving a second carrier wave of a second radio frequency from said information storage medium by means of a reception antenna provided in parallel to said transmission antenna and situated to overlap said transmission antenna by a predetermined length, thereby to reduce electromagnetic mutual interference with said transmission antenna; and adjusting the length of the overlapping portion of the transmission antenna and the reception antenna, whereby an optimal positional relationship between the transmission antenna and the reception antenna is determined to reduce the electromagnetic mutual interference to a minimum.

5. A data transmission/reception method in a portable radio card reader/writer for performing radio data transmission/reception with a radio card having a transmission/reception antenna for use in both transmission and reception and having a radio communication function, wherein said radio card reader/writer can be folded into a plurality of parts, thereby performing predetermined information processing, said method comprising:

generating transmission data to be transmitted to the radio card and processing reception data received from the radio card;

inputting data to be processed in said processing step;

displaying the data processed in said processing step;

generating a first carrier wave including said transmission data by means of a tuning circuit for transmission which is tuned to a first radio frequency;

radiating said first carrier wave by means of a transmission antenna formed in a loop shape;

receiving a second carrier wave of a second radio frequency from said radio card by means of a reception antenna, said reception antenna being provided in parallel to said transmission antenna and situated to overlap said transmission antenna by a predetermined length, thereby to reduce electromagnetic mutual interference with said transmission antenna;

receiving the second carrier wave including the reception data from the radio card by means of a tuning circuit for reception which is tuned to the second radio frequency; and sliding said transmission antenna and said reception antenna relative to each other, wherein said transmission antenna and said reception antenna are slide relative to each other to a stop position, thereby arranging both antennas such that both antennas overlap each other by said predetermined length.

6. A data transmission/reception method in a portable radio card reader/writer for performing radio data transmission/reception with a radio card having a transmission/reception antenna for use in both transmission and reception and having a radio communication function, thereby performing predetermined information processing, wherein said radio card reader/writer can be folded into a plurality of parts, and said method comprising:

generating transmission data to be transmitted to the radio card and processing reception data received from the radio card, inputting data to be processed in said processing step;

displaying the data processed in said processing step;

generating a first carrier wave including said transmission data by means of a tuning circuit for transmission which is tuned to a first radio frequency;

radiating said first carrier wave by means of a transmission antenna formed in a loop shape;

receiving a second carrier wave of a second radio frequency from said radio card by means of a reception antenna, said reception antenna being provided in parallel to said transmission antenna and situated to overlap said transmission antenna by a predetermined length, thereby to reduce electromagnetic mutual interference with said transmission antenna;

receiving the second carrier wave including the reception data from the radio card by means of a tuning circuit for reception which is tuned to the second radio frequency; and folding said transmission antenna and said reception antenna toward each other, wherein said transmission antenna and said reception antenna are unfolded away from each other, thereby arranging both antennas such that both antennas overlap each other by said predetermined length.

* * * * *